United States Patent [19]
Gross et al.

[11] Patent Number: 6,119,212
[45] Date of Patent: Sep. 12, 2000

[54] ROOT SIZE DECREASE ON A UNIX BASED COMPUTER SYSTEM

[75] Inventors: Danny Brice Gross, Bastrop; Michael Douglas O'Donnell, Austin; Gene Regis Toomey, Kyle, all of Tex.

[73] Assignee: Advanced Micro Devices, Inc., Sunnyvale, Calif.

[21] Appl. No.: 08/841,540

[22] Filed: Apr. 23, 1997

[51] Int. Cl.[7] .................................................. G06F 12/06
[52] U.S. Cl. ............................. 711/173; 711/2; 711/173; 707/200; 395/559; 395/569
[58] Field of Search .................................. 711/1, 2, 170, 711/171, 172, 173; 395/651, 652, 527, 712, 650, 653, 559, 569; 707/200

[56] References Cited

U.S. PATENT DOCUMENTS

| | | | |
|---|---|---|---|
| 3,516,070 | 6/1970 | Campano et al. | 340/172.5 |
| 4,855,903 | 8/1989 | Carleton et al. | 364/200 |
| 4,918,653 | 4/1990 | Johri et al. | 364/900 |
| 4,958,273 | 9/1990 | Anderson et al. | 364/200 |
| 5,155,837 | 10/1992 | Liu et al. | 395/500 |
| 5,155,847 | 10/1992 | Kirouac et al. | 395/600 |

(List continued on next page.)

OTHER PUBLICATIONS

"3900 Model 6 Storage Control," IBM Technical Disclosure Bulletin, Jun. 12, 1995, 4 pages; http://www1.ibmlink.ibm.com/HTML/SPEC/g5206441.html.

"Channels—The Other Network: The Fundamentals of Mainframe Channels for Network Professionals," Polaris Communications, Inc. On–Line Resources White Papers, 1997–1999; 13 pages; wysiwyg://25http://www.polariscomm.com/white/mf_channel_contents.shtml_–chfand.shtml_indepth.shtml.

"Chapter 5. Central Computing Facilities," McGill University Computing Centre Guide to Computing, printed Sep. 11, 1999; 2 pages; http://www.mcgill.ca/cc/guide/central.htm.

"IBM 3090–600J," University of Kentucky Computing Center, Sep. 11, 1992; 2 pages; http://ukcc.uky.edu/~ukccinfo/ibm3090.html.

Fuchel, Kurt; "IBM Rides Again," LINK.bnl May 1996; 3 pages; http://www.ccd.bnl.gov/LINK.bnl/1996/May96/histcom5.html.

Baily, David; "Disk Partitions. (CPC UNIX) (Column) (tutorial)"; Oct. 1994; UNIX Review vol. 12; No. 11; p. 77.

Guen Sik Na; Sun Shin An; "A design and implementation of distributed file system"; 1990; Netherlands; Communication Systems; Towards Global Integration, singapore ICCS '90 proceedings; p 3.4/1–5 vol. 1.

Scott, P.E; Marvin J.S.; Quinst, R.D.; "Boot mechanism for discless Hp–UX."; Oct. 1998; United States; Hewlett Packard Journal; vol. 39; No. 5; p. 33–36.

*Primary Examiner*—John W. Cabeca
*Assistant Examiner*—David Ransom
*Attorney, Agent, or Firm*—Skjerven, Morrill, MacPherson, Franklin & Friel, L.L.P.

[57] ABSTRACT

A method for decreasing the size of a root partition on a computer system operating under control of a UNIX type operating system without reinstalling the operating system. The computer system includes a first storage device. The first storage device includes the root partition which has a first size. The root partition includes a root file system. The method includes backing up the root file system to a backup file system, booting the computer system to a maintenance mode, deactivating the root partition, activating the root partition at a second size smaller than the first size, and restoring the root file system from the backup file system.

21 Claims, 3 Drawing Sheets

U.S. PATENT DOCUMENTS

| | | | |
|---|---|---|---|
| 5,276,867 | 1/1994 | Kenley et al. | 395/600 |
| 5,341,494 | 8/1994 | Thayer et al. | 395/425 |
| 5,363,487 | 11/1994 | Willman et al. | 395/275 |
| 5,454,103 | 9/1995 | Coverston et al. | 395/600 |
| 5,490,260 | 2/1996 | Miller et al. | 395/427 |
| 5,502,836 | 3/1996 | Hale et al. | 395/497.01 |
| 5,539,899 | 7/1996 | Huynh et al. | 395/497.02 |
| 5,574,851 | 11/1996 | Rathunde | 395/182.05 |
| 5,577,233 | 11/1996 | Goetttelmann et al. | 395/500 |
| 5,594,903 | 1/1997 | Bunnell et al. | 395/712 |
| 5,627,995 | 5/1997 | Miller et al. | 395/497.02 |
| 5,675,795 | 10/1997 | Rawson, III et al. | 395/652 |
| 5,678,042 | 10/1997 | Pisello et al. | 395/610 |
| 5,696,897 | 12/1997 | Dong | 395/182.13 |
| 5,696,968 | 12/1997 | Merkin | 395/652 |
| 5,701,429 | 12/1997 | Legvold et al. | 395/441 |
| 5,701,516 | 12/1997 | Cheng et al. | 395/842 |
| 5,715,464 | 2/1998 | Crump et al. | 395/750 |
| 5,737,745 | 4/1998 | Matsumoto et al. | 711/114 |
| 5,764,972 | 6/1995 | Crouse et al. | 395/601 |
| 5,771,354 | 6/1998 | Crawford | 395/200.59 |
| 5,778,070 | 6/1996 | Mattison | 380/25 |
| 5,778,395 | 7/1998 | Whiting et al. | 707/204 |
| 5,790,849 | 8/1998 | Crocker et al. | 395/652 |
| 5,802,297 | 9/1998 | Engquist | 395/200.42 |
| 5,805,903 | 9/1998 | Elkhoury | 395/750.01 |
| 5,809,564 | 9/1998 | Craze et al. | 711/208 |
| 5,828,876 | 7/1996 | Fish et al. | 395/601 |
| 5,907,672 | 10/1995 | Matze et al. | 395/182.06 |
| 5,930,513 | 6/1996 | Taylor | 395/712 |

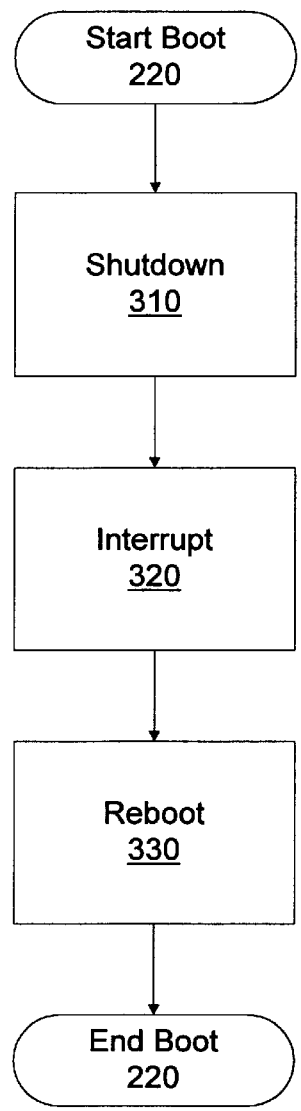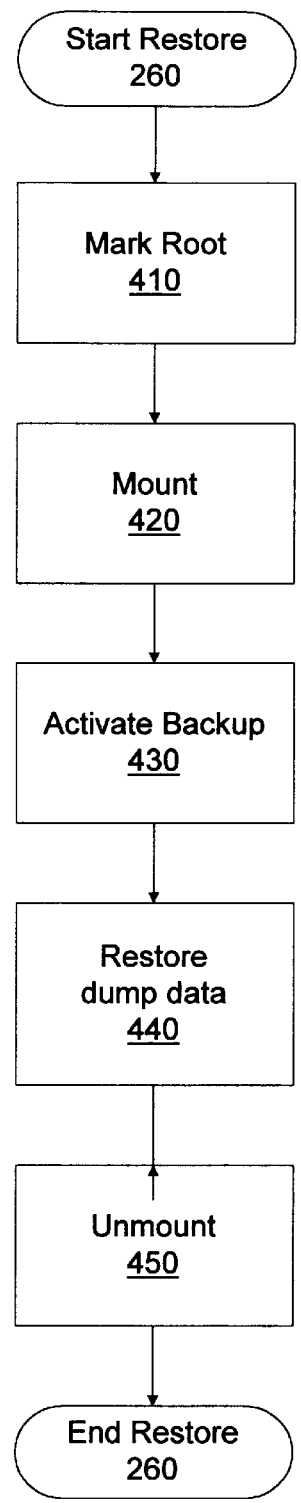
Figure 3
Figure 4

ROOT SIZE DECREASE ON A UNIX BASED COMPUTER SYSTEM

CROSS-REFERENCE TO RELATED APPLICATIONS

This patent relates to U.S. Pat. No. 5,991,860, entitled "Root File System Size Increase on a UNIX Based Computer System", which is incorporated herein by reference.

This patent relates to U.S. Pat. No. 5,964,874, entitled "Swap Size Decrease on a UNIX Based Computer System", which is incorporated herein by reference.

This patent relates to U.S. Pat. No. 5,968,170, entitled "Primary Swap Size Increase on a UNIX Based Computer System", which is incorporated herein by reference.

BACKGROUND

1. Field of Use

This invention relates to computer systems and, more particularly, to methods of decreasing the size of root file systems on UNIX type operating system based computer systems.

2. Description of the Related Art

Computer systems are information handling systems which can be designed to give independent computing power to one user or a plurality of users. Computer systems have attained widespread use in providing computer power to many businesses and institutions. Some important applications in which computer systems have become common include manufacturing monitoring and control; electrical, mechanical, and chemical system design and simulation; and network management and service. Productive processing time is of great importance to the users of these computer applications because system down time can result in significant costs.

Computer systems are designed to provide a degree of system availability that is necessitated by the applications for which the computer system is intended. System availability ranges from the ability of a system to remain functional in spite of failures in a portion thereof, to the minimization of a system's down-time in the event of a failure or necessary upgrade. High availability (HA) computer systems, as their name implies, are required to be available, or "on," virtually all of the time. For example, because many computer applications involve the use of network servers to provide processing power to multiple users, it is important that the network server be available as much as possible. Such computer systems (or networks of such computer systems) should be capable of being upgraded with minimal system down time.

High availability computer systems must be able to restart as soon as possible after a system upgrade. System upgrades or patches are often necessitated by the establishment of new system requirements. Unfortunately, performing a system upgrade such as resizing the root file system on a UNIX based computer system typically requires that the computer system be powered down or turned off, and that the operating system be reinstalled with the required changes.

Commonly, when a computer system requires an upgrade, patches are made to the operating system of the computer system. Often, new patches are added to the patches from a previous system upgrade resulting in a large number of patches for each successive upgrade. The successful patches are then updated to other computer systems by replacing the present operating system of those computer systems with the new operating system including the successful patches. The new operating system is often installed from a storage device such as a tape drive to directly replace the present operating system needing the upgrade. Alternatively, the new operating system can be downloaded over a network.

Use of the method set forth above has certain consequences. Notably, using this method usually requires that the computer system be shut down. A backup of the present operating system usually must be made, and the upgrades or patches must be loaded while the computer system is down. Additionally, upgrades must often be made for multiple computer systems, causing down-time for all the systems involved. For example, in a network of servers, each server must be upgraded individually. That is, the system manager must power down a server, thereby limiting server availability by preventing user access, make a backup of the present operating system, load the new operating system, and test the new operating system. The system manager then repeats these actions for each of the other servers. The computer system being upgraded is usually down throughout the procedure, possibly for a period of hours. The cost for system downtime during these upgrades can be significant. Also, the chances for error or failure can be significant with this practice.

An alternative method allows upgrading the computer system while the computer system is operating. An operating system may be upgraded by selecting and preparing a new boot device while the computer system is functioning, loading the new operating system onto the new boot device while the computer system is functioning, and rebooting the computer system using the new boot device. Such a method of upgrading computer systems is disclosed in U.S. patent application Ser. No. 08/785,491, attorney docket No. M-4525 US, filed on Jan. 17, 1997, entitled "Installing Operating Systems Changes on a Computer System," naming Danny B. Gross, Michael D. O'Donnell and Gene R. Toomey as inventors.

SUMMARY

It has been discovered that a root file system may be upgraded by decreasing its size without having to reinstall the operating system or preparing an alternate boot device. Such a procedure advantageously allows the system to be upgraded while minimizing the system's resulting down time and minimizing potential errors during operating system reinstallation. Thus, the reliability and efficiency of making upgrades is improved with a simplified upgrade procedure that also reduces costs resulting from system upgrades requiring root file system decreases.

In one embodiment of the invention, a method for decreasing the size of a root partition on a computer system operating under control of a UNIX type operating system without reinstalling the operating system is provided. The computer system includes a first storage device. The first storage device includes the root partition which has a first size. The root partition includes a root file system. The method includes backing up the root file system to a backup file system, booting the computer system to a maintenance mode, deactivating the root partition, activating the root partition at a second size smaller than the first size, and restoring the root file system from the backup file system.

In another embodiment, a first computer system is configured to upgrade a second computer system operating under control of a UNIX type operating system. The second computer system includes a root file system. The first computer system includes an upgrade module for decreasing the size of the root file system on the second computer system without reinstalling the UNIX type operating system on the second computer system.

In another embodiment, an apparatus for decreasing the size of a root partition on a first computer system operating under control of a UNIX type operating system is provided. The apparatus includes a computer-readable storage medium and an upgrade module stored on the computer-readable storage medium. The upgrade module is for upgrading the first computer system by decreasing the size of the root partition on the first computer system without reinstalling the operating system. The upgrade module upgrades the first computer system responsive to being accessed by a second computer system.

BRIEF DESCRIPTION OF THE DRAWINGS

The present invention may be better understood, and its numerous objects, features, and advantages made apparent to those skilled in the art by referencing the accompanying drawings.

FIG. 3 shows a flow chart for booting the exemplary computer system of FIG. 1 according to an embodiment of the invention.

FIG. 4 shows a flow chart for restoring information according to an embodiment of the invention.

The use of the same reference symbols in different drawings indicates similar or identical items.

DESCRIPTION OF THE PREFERRED EMBODIMENT(S)

The following sets forth a detailed description of the preferred embodiments. The description is intended to be illustrative of the invention and should not be taken to be limiting. Many variations, modifications, additions, and improvements may fall within the scope of the invention as defined in the claims which follow.

In one embodiment, a computer system is upgraded to decrease the size of the root file system. The computer system is rebooted to single user mode after a root backup is created. The root volume group is activated and the root logical volume is removed. A new root logical volume is created with the appropriate size, and the root backup is restored to the new root logical volume. The new root logical volume is logically connected with the root file system, and the computer system is rebooted to bring the computer system on line with the smaller root file system.

Figure 1:
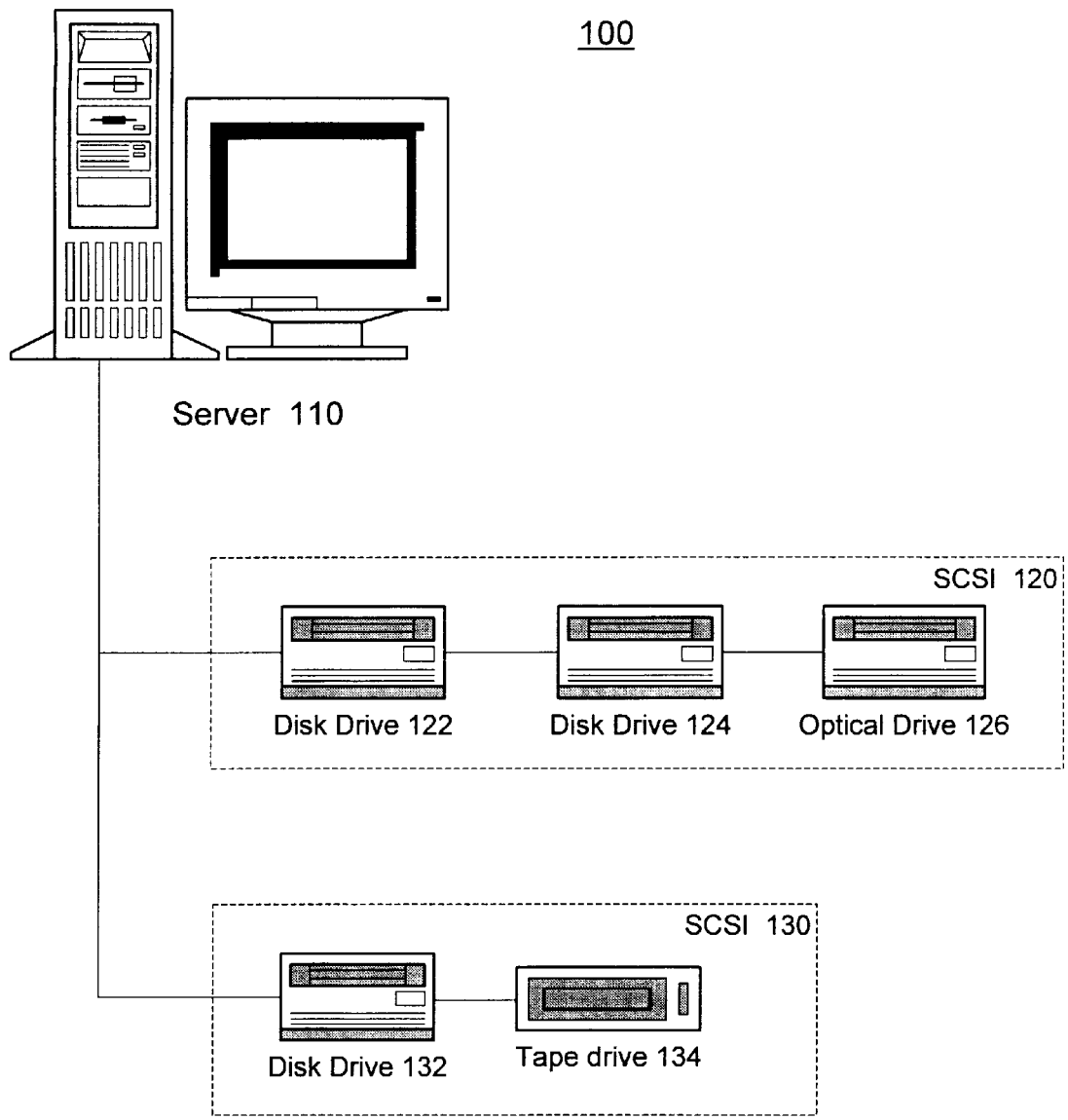
FIG. 1 shows an exemplary computer system according to an embodiment of the invention.

Referring to FIG. 1, exemplary computer system 100 includes server 110 which is coupled to various memory storage devices. The memory storage devices are coupled to server 110 by Small Computer System Interface (SCSI) chains 120 and 130. The memory storage devices include disk drives 122 and 124 and optical disk drive 126 in SCSI chain 120, and disk drive 132 and tape drive 134 in SCSI chain 130.

In one embodiment, computer system 100 is, for example, a Hewlett Packard Series 800 computer system running the HP-UX 9.04 type UNIX operating system. Such a computer system may function as a server for other computer systems. It is understood that other computer systems and other comparable operating systems (e.g., the International Business Machines AIX operating system) may be used in accordance with the invention. Additionally, although the disk drives are connected to their respective computer systems in SCSI chains in the preferred embodiment, any appropriate connection means may be used in accordance with the invention. Further although computer system 100 includes server 110, computer system 100 may include any type of computer system, including, for example, mainframes, minicomputers, workstations and personal computer systems.

Exemplary computer system 100 operates under control of the optional Logical Volume Manager (LVM) subsystem of the HP-UX operating system. The LVM system enables system administrators to manage disk space in terms of volume groups and logical volumes rather than, or in addition to, fixed-sized disk sections. A volume group can include, for example, multiple physical volumes (physical disks) and/or multiple logical volumes (logical disks).

Specifically, the storage of a computer system configured according to the LVM system consists of groupings of disks initialized for LVM and organized into volume groups. A volume group might include one or many LVM disks, and an entire system may include one or several volume groups. Just as volume groups are groupings of one or more physical LVM disks, also called physical volumes, volume groups are also subdivided into virtual disks, called logical volumes.

A logical volume is a partition. As such, a logical volume is a distinct portion of a storage device that functions as though it were a physically separate unit. Logical volumes can encompass space on one or more physical volumes, span physical volumes, and/or represent only a portion of a physical volume. Like disk sections, logical volumes can hold file systems, swap areas, and raw data. Disk space in a volume group is apportioned by creating logical volumes. The size of a logical volume is determined by its number of extents, each being four megabytes by default, and is configurable. File systems and swap space are then assigned to the logical volumes within the volume group.

Typically, using basic UNIX commands, a logical volume can be created and extended to allocate sufficient space for a file system, user application, or raw data. New file systems may be mounted or applications installed on the logical volume. The same approach may be used when decreasing the capacity of a file system created on a logical volume.

The root volume group is a special volume group that includes the system boot disks, storage areas designated for containing specific data such as the root file system (/) logical volume and the file system containing /usr, storage areas with designated space for storing temporary data such as the primary swap logical volume and the file system containing /tmp. The root, swap and usr logical extents may be mapped to physical extents on the same physical disk or on different physical disks within the root volume group. Typically, the boot area is at a specific region on the same physical volume that contains the root logical volume.

The root logical volume contains the operating system software and has certain restrictions that do not apply to regular logical volumes. The root logical volume should be located at a specific location on a bootable disk so the root file system can always be found on the disk containing it. Furthermore, the root logical volume should be created with contiguous allocation of physical extents. Also, the size of the root logical volume is typically predetermined since the root (/) file system is not unmountable and unmounting a file system is considered a prerequisite for extending the file system's size.

Figure 2:
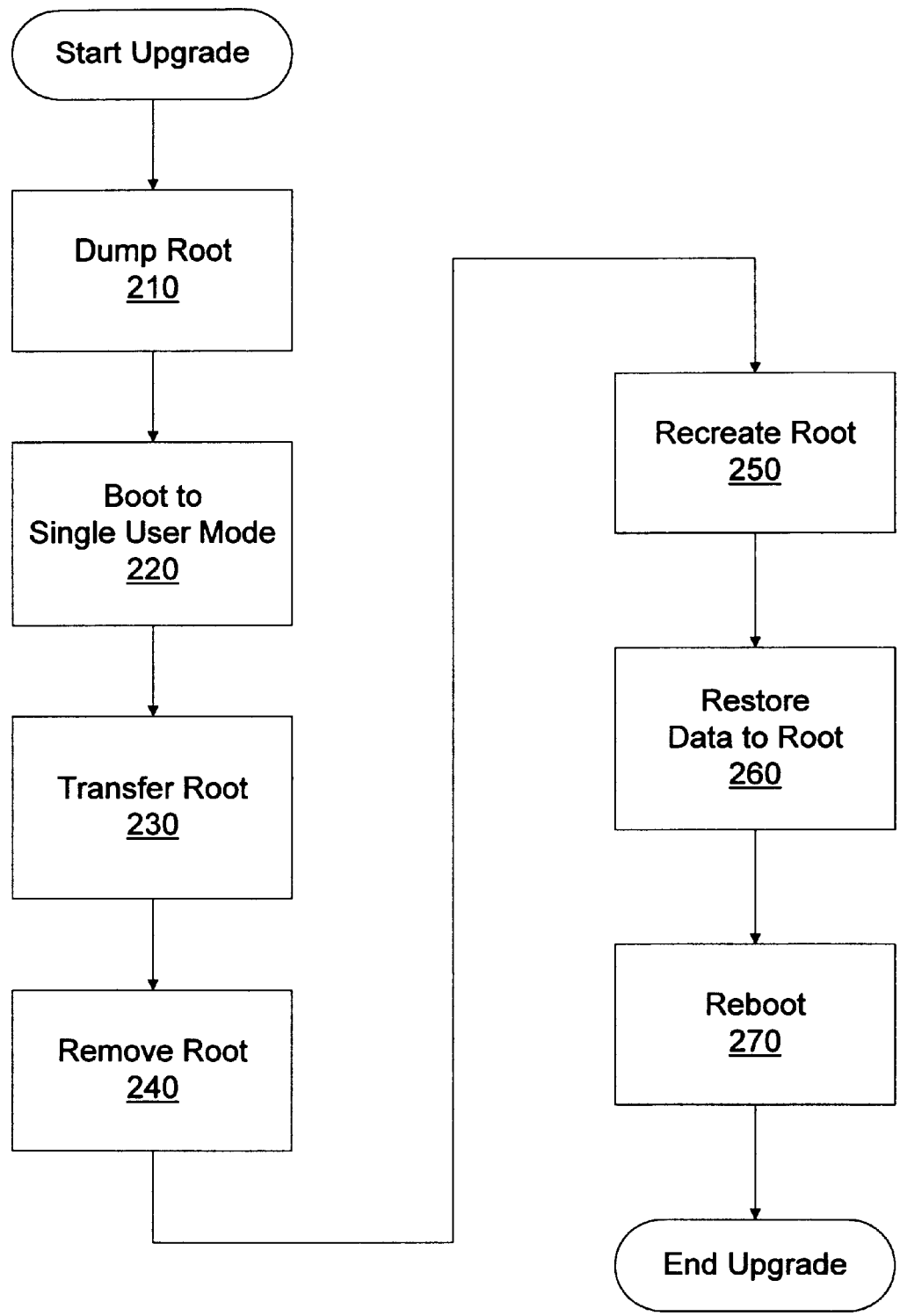
FIG. 2 shows a flow chart for decreasing the size of the root file system according to an embodiment of the invention.

FIG. 2 shows a flow chart of the operation of an upgrade module for upgrading computer system 100 by decreasing the size of the root file system without unmounting the root file system or reinstalling the operating system on computer system 100. It is appreciated that the upgrade module and other modules discussed herein may consist of directly entered commands by a computer system user, or steps executed by a software module or a hardware module either directly on computer system 100 or remotely on computer system 100 from another computer system.

At dump step 210, the root logical volume is backed-up to a backup storage device such as a tape drive or a disk drive. The root logical volume is backed up for safety reasons. A backup storage device is provided (e.g., a physical volume or a volume group) with space to store the root file system. The backup storage device may be provided on a physical storage device the same as or different from the physical storage device of the root volume group, or on a logical storage device the same as or different from the logical storage device already storing the information. A directory (e.g., /copy) is provided on the backup storage device (e.g., backup volume group vgAPP) for receiving the root file system. For example, the logical volume lvol4 is created using the well known LVM command lvcreate, and the size of the logical volume is specified by the option -l. The copy directory is created using the well known UNIX commands mkdir and mount.

The root file system may be loaded to the provided backup storage device by either copying or moving. The following command performs a dump to the file root.dump located in the /copy directory:

dump 0sf 145000 /copy/root.dump /dev/vg00/rlvol1.

The dump command backs up the file system indicated in the command line. The above dump command specifies a full dump (option 0) with a size of 145,000 meters (option s) to the file /copy/root.dump. In this embodiment, a disk drive is selected as the backup device (the device to which /copy is mounted), and the tape length option s has no effect. The option s is included for uniformity of commands and is useful when, for example, a script executing on a computer system calls the dump command and the backup device provided is a tape drive. The command line argument /dev/vg00/lvol1 is the logical volume name of the original root file system. In this embodiment, the dump command creates a file containing the data from root in the /copy directory in the logical volume to which /copy is mounted (e.g., lvol4) on the volume group vgAPP.

Control then transitions to boot step 220. During boot step 220, computer system 100 is rebooted and brought to single user mode. FIG. 3 shows a flow chart of the operation of a boot module for booting computer system 100 to single user mode according to boot step 220. At shutdown step 310, computer system 100 is shutdown using the following command:

/etc/shutdown -r

Control then transitions to interrupt step 320. During interrupt step 320, the reboot of computer system 100 is interrupted. After computer system 100 performs its memory checks, computer system 100 provides an opportunity to interrupt the boot cycle. For example, computer system 100 prompts the user to "press any key to interrupt." Responsive to a boot process interrupt, computer system 100 displays a boot drive selection prompt such as "Boot from primary path?" prompt, to which the user responds "y". Computer system 100 next displays an "Interact with IPL [Initial Program Loader]?" prompt to which the user also responds "y".

Control then transitions to reboot step 330. During reboot step 330, computer system 100 is booted to single user mode. For example, the command hpux is a specific secondary system loader (SSL) utility for loading the operating system kernel. The exemplary boot command hpux -lm (;0)/hp-ux boots computer system 100. The -lm option indicates that computer system 100 is to be booted to LVM maintenance mode (i.e., brought to single user mode without activating any volume groups). The -lm option configures only the root volume before initiating single user mode. The command line argument (;0) designates the default boot disk. The /hp-ux argument is the actual kernel file that computer system loads into memory. When computer system 100 is booted, the UNIX operating system has been installed into the memory of computer system 100. Computer system 100 is in single user mode and all volume groups are deactivated including the root volume group. The root file system is not mounted.

Referring again to FIG. 2, control transitions from boot step 220 to activate step 230. During activate step 230, the root volume group is activated, thereby making the alternative root volume group available for manipulation. The command vgchange -a y /dev/vg00 activates the root volume group (vg00). The -a y option activates the particular volume group named by the immediately following argument (/dev/vg00), and activates all associated physical volumes (e.g., disk drives) and logical volumes.

Control then transitions to remove root step 240. During remove root step 240, the root logical volume is removed as a bootable device using the lvrmboot command and is removed using the lvremove command. The lvrmboot command removes the logical volume link to the indicated root logical volume. For example, the command lvrmboot -r /dev/vg00/lvol1 updates all physical volumes contained in the volume group such that the logical volume /dev/vg00/lvol1 is removed as the root when the system is next booted on the volume group. The -r option indicates that the root definition should be removed from the volume group. The lvremove command removes the indicated logical volume from its volume group. For example, the command:

lvremove /dev/vg00/lvol1 removes the root logical volume (lvol1) from the alternative root volume group (vg00). The root logical volume may be safely removed because the data in the root file system has already been backed up.

Control then transitions to recreate root step 250. During recreate root step 250, the original root logical volume is recreated at a smaller size and the root file system is recreated. Making a new file system on a volume group is a standard system administration task. For example, the command lvcreate -d p -l <SIZE> -C y -r n -s y -n lvol1 /dev/vg00 creates a logical volume named lvol1 (option -n), having a desired size in logical extents which is indicated by the variable <SIZE> (option -l), and located within the provided volume group named vg00. The alternative root volume group vg00 must have at least <SIZE> extents for the root file system. The option -d p sets the parallel scheduling policy. The option -C y sets the contiguous space requirement The option -r n sets the no relocate option. The option -s y specifies that mirror copies cannot occupy the same disk.

Next, the newfs command constructs a new root file system. Specifically, the command

```
newfs /dev/vg00/rlvol1 <DISKTYPE>
``` creates a new file system on the recreated logical volume lvol1. The raw logical volume was designated by the preceding the name of the logical volume with an "r" (e.g., rlvol1). <DISKTYPE> indicates the type of disk drive used for the alternative root volume group vg00.

Control then transitions to restore step 260. During restore step 260, the backed up root data is restored to the smaller root file system. FIG. 4 shows a flow chart of the operation of a restoration module for restoring the root data according to restore step 260.

At mark root step 410, the recreated root logical volume is re-identified to computer system 100. For example, the lvlnboot command is used to point computer system 100 to the root logical volume on the alternative root volume group:

```
lvlnboot -r /dev/vg00/lvol1
```

Control then transitions to mount step 420. During mount step 420, the space of the recreated root file system is applied to a temporary directory. The mkdir command creates the temporary directory. The mount command announces to the system that a removable file system is to be attached to the file tree at a directory indicated in the command line. The indicated directory becomes the root of the newly mounted file system. For example, the commands

```
mkdir /mnt
mount /dev/vg00/lvol1 /mnt
cd /mnt
``` create a temporary /mnt directory and mount the space of the root file system against the /mnt directory. The temporary directory /mnt is selected as the current directory.

Control then transitions to activate backup step 430. During activate backup step 430, the root data that was backed up is prepared for restoration to the smaller root file system. For example, the following commands activate the backup file system, perform a mandatory file system check, and mount the backup root file system to the directory /copy:

```
vgchange -a y /dev/vgAPP
fsck /dev/vgAPP/lvol4
mount /dev/vgAPP/lvol4 /copy
```

The vgchange command activates the backup root volume group (vgAPP). The -a y option activates the particular volume group named by the immediately following argument (/dev/vgAPP), and activates all associated physical volumes (e.g., disk drives) and logical volumes. The fsck command performs a file system consistency check and interactively repairs inconsistent conditions for HP-UX file systems on mass storage device files identified in the command line. The logical volume lvol4 is the backup root logical volume which was created earlier during dump step 210. The mount command announces to computer system 100 that a removable file system (/copy) is to be attached to the file tree at /dev/vgAPP/lvol4. The lvol4 directory becomes the root of the newly mounted file system /copy.

Control then transitions to restore dump data step 440. During restore dump data step 440, the root backup data is restored to the recreated root file system using, for example, the following command:

```
restore rf /copy/root.dump
```

The r option specifies that the restore is unconditional and overwrites existing files. The f option tells the program where to find the backup (/copy/root.dump). The restore command leaves a file called restoresymtab in the root directory of the file system to pass information between incremental restore passes. This file should be removed after the last incremental restore pass. The command rm restoresymtab removes the restoresymtab file.

Control then transitions to unmount step 450. During unmount step 450, the temporary file system /mnt is unmounted. After changing directory away from /mnt (e.g., cd /), the /mnt directory can be unmounted using the following command:

```
umount /mnt
```

Referring again to FIG. 2, after restore step 260, control transitions to reboot step 270. During reboot step 270, computer system 100 is rebooted to make the changes take effect. The command /etc/reboot initiates a reboot of computer system 100 so that computer system 100 may be restarted with the smaller root file system.

While the invention has been described with reference to various embodiments, it will be understood that these embodiments are illustrative and that the scope of the invention is not limited to them. Many variations, modifications, additions, and improvements of the embodiments described are possible.

For example, although the above commands may be entered into a computer system by a computer system user, the above commands may be included in a script or batch file which can be stored on a machine-readable or computer-readable storage medium such as disk drive 132 or a CD-ROM. Furthermore, a computer system may be configured to execute the above commands on another computer system, thereby performing the upgrade without reinstalling the operating system on the other computer system. This embodiment is useful in a distributed computing environment.

Also, those skilled in the art will recognize that the UNIX commands and options of the preferred embodiment are exemplary and that other commands and options of the UNIX operating system or similar operating systems (such as the IBM AIX operating system) may be used in accordance with the invention. Modifications to the above series of commands will be apparent to those skilled in the art.

Additionally, those skilled in the art will recognize that although the functions of the above referenced modules are performed by user inputs or software modules in the present embodiment, other types of modules may be used such as application specific hardware modules and configured hardware modules. Also, the boundaries between modules are merely illustrative and alternative embodiments may merge modules or impose an alternate decomposition of functionality of modules. For example, a software module for booting the computer system to single user mode and a software module for rebooting the computer system after the primary swap size is increased may be merged into a single boot module having a boot portion and a reboot portion. The merged boot module could be initiated with different parameters to boot to different modes. Alternatively, portions of a reboot module for rebooting a computer system may be decomposed into modules to perform the separate steps of the original reboot module. For example, the reboot module could be decomposed into a shutdown module, an interrupt module and a single user boot module. Moreover, alternative embodiments may combine multiple instances of a particular component.

These and other variations, modifications, additions, and improvements may fall within the scope of the invention as defined in the claims which follow.

What is claimed is:

1. A method for decreasing the size of a root partition on a computer system operating under control of a UNIX type operating system without reinstalling the operating system, the computer system including a first storage device, the first storage device including the root partition, the root partition having a first size, the root partition including a root file system, the method comprising:

backing up the root file system to a backup file system;

booting the computer system to a maintenance mode;

deactivating the root partition;

activating the root partition at a second size smaller than the first size; and restoring the root file system from the backup file system.

2. The method of claim 1 further comprising rebooting the computer system to a normal mode using the root file system at the second size.

3. The method of claim 1, wherein the backing up comprises:

providing a storage device for storing the root file system;

creating a backup file system for storing the root file system on the provided storage device; and loading the root file system to the backup file system.

4. The method of claim 1, wherein the booting comprises:

shutting down the computer system by initiating a reboot of the computer system;

interrupting the reboot of the computer system; and selecting the single user mode.

5. The method of claim 1, wherein the deactivating the root partition comprises:

declassifying the root partition as a bootable logical device of the computer system; and removing the root partition from the first storage device.

6. The method of claim 1, wherein the activating the root partition comprises creating a second root partition after removing the root partition from the first storage device, the second root partition having the second size smaller than the first size.

7. The method of claim 6, wherein the restoring the root file system from the backup file system comprises:

identifying the second root partition to the computer system; and copying the backup file system to the second root partition.

8. The method of claim 7, wherein the restoring the root file system from the backup file system further comprises:

mounting a first directory to the second root partition after identifying the second root partition to the computer system;

activating the backup file system after identifying the second root partition to the computer system if the backup file system is not active; and mounting a second directory to the backup root file system after activating the backup file system and before copying the backup file system to the second root partition.

9. The method of claim 1, wherein the computer system further operates under control of a logical volume manager operating subsystem;

the computer system includes a root volume group;

the root partition is a root logical volume, the root volume group including the root logical volume, the root logical volume including the root file system.

10. A first computer system configured to upgrade a second computer system operating under control of a UNIX type operating system, the second computer system including a root file system, the first computer system comprising:

an upgrade module for decreasing the size of the root file system on the second computer system without reinstalling the UNIX type operating system on the second computer system.

11. The computer system of claim 10, wherein the upgrade module comprises:

a backup portion, the backup portion backing up the root file system to a backup file system;

a boot portion, the boot portion booting the computer system to a maintenance mode;

a deactivation portion, the deactivation portion deactivating the root partition;

an activation portion, the activation portion activating the root partition at a second size smaller than the first size; and a restoration portion, the restoration portion restoring the root file system from the backup file system.

12. The method of claim 11 further comprising a second boot portion, the second boot portion booting the computer system to a normal mode using the root file system at the second size.

13. The method of claim 11, wherein the backup portion comprises:

a create portion, the create portion creating a backup file system for storing the root file system on the provided storage device; and a load portion, the load portion loading the root file system to the backup file system.

14. The method of claim 11, wherein the boot portion comprises:

a shutdown portion, the shutdown portion shutting down the computer system by initiating a reboot of the computer system;

an interruption portion, the interruption portion interrupting the reboot of the computer system; and a selection portion, the selection portion selecting the single user mode.

15. The method of claim 11, wherein the activation portion creates a second root partition after removing the root partition from the first storage device, the second root partition having the second size smaller than the first size.

16. The method of claim 10, wherein the first and second computer systems further operate under control of a logical volume manager operating subsystem;

the second computer system includes a root volume group;

the root partition is a root logical volume, the root volume group including the root logical volume, the root logical volume including the root file system.

17. An apparatus for decreasing the size of a root partition on a first computer system, the apparatus comprising:

a computer-readable storage medium;

a UNIX type operating system that operates on the first computer system; and an upgrade module stored on the computer-readable storage medium, the upgrade module for upgrading the first computer system by decreasing the size of the root partition on the first computer system without reinstalling the operating system, the upgrade module upgrading the first computer system responsive to being accessed by a second computer system.

18. The apparatus of claim 17, wherein the upgrade module comprises:

a backup portion for backing up the root file system to a backup file system;

a boot portion for booting the computer system to a maintenance mode;

a deactivation portion for deactivating the root partition;

an activation portion for creating and activating a second root partition at a second size smaller than the first size; and a restoration portion for restoring the root file system from the backup file system.

19. The apparatus of claim 18 further comprising a second boot portion, the second boot portion for booting the computer system to a normal mode using the root file system at the second size.

20. The apparatus of claim 18, wherein the backup portion comprises:

a create portion for creating a backup file system for storing the root file system on the provided storage device; and a load portion for loading the root file system to the backup file system.

21. The apparatus of claim 18, wherein the boot portion comprises:

a shutdown portion for shutting down the computer system by initiating a reboot of the computer system;

an interruption portion for interrupting the reboot of the computer system; and a selection portion for selecting the single user mode.

* * * * *